United States Patent [19]

Okabe

[11] 4,456,356
[45] Jun. 26, 1984

[54] FOCUS ADJUSTING DEVICE OF A CAMERA

[75] Inventor: Nobuo Okabe, Tokyo, Japan

[73] Assignee: Nippon Kogaku K. K., Tokyo, Japan

[21] Appl. No.: 399,122

[22] Filed: Jul. 16, 1982

Related U.S. Application Data

[63] Continuation of Ser. No. 299,385, Sep. 4, 1981, abandoned.

[30] Foreign Application Priority Data

Sep. 11, 1980 [JP] Japan ................................ 55-129677

[51] Int. Cl.$^3$ ............................................... G03B 3/10
[52] U.S. Cl. ............................... 354/195.13; 350/255; 354/410
[58] Field of Search .......................... 354/195, 198, 25; 352/140; 350/429, 255

[56] References Cited

U.S. PATENT DOCUMENTS

| | | | |
|---|---|---|---|
| 4,057,327 | 11/1977 | Kumazawa | 354/195 X |
| 4,200,377 | 4/1980 | Holderbaum | 354/195 |
| 4,272,174 | 6/1981 | Terramoto et al. | 354/195 |
| 4,283,131 | 8/1981 | Ohnuki et al. | 354/195 |
| 4,319,820 | 3/1982 | Ostrowski et al. | 354/195 X |

*Primary Examiner*—John Gonzales

*Attorney, Agent, or Firm*—Shapiro and Shapiro

[57] ABSTRACT

A focus adjusting device of a camera has moving means for moving a phototaking lens in the direction of the optical axis thereof, a motor producing a revolution output, a manually operated ring provided on the outer periphery of a lens barrel and rotatable circumferentially of the lens barrel, mode selecting means for selecting one of a manual mode in which the phototaking lens is driven by the manually operated ring and an automatic mode in which the phototaking lens is driven by the motor, and clutch means for coupling the moving means and the manually operated ring together when the manual mode has been selected by the mode selecting means and for cutting off the coupling between the moving means and the manually operated ring when the automatic mode has been selected by the mode selecting means. The device further has limit means for blocking movement of the moving means when the phototaking lens has come to an infinity in-focus position and when the phototaking lens has come to a very short distance in-focus position. The clutch means produces slip between the manually operated ring and the moving means when the manually operated ring is rotated by a great torque, thereby permitting rotation of only the manually operated ring.

7 Claims, 3 Drawing Figures

FOCUS ADJUSTING DEVICE OF A CAMERA

This is a continuation application of Ser. No. 299,385, filed Sept. 4, 1981, now abandoned.

BACKGROUND OF THE INVENTION

1. Field of the Invention

This invention relates to a focus adjusting device of a camera which can drive a phototaking lens by operation of a manually operated ring and also can drive the phototaking lens by the revolution output of a motor.

2. Description of the Prior Art

As a device of such type, there is known a focus adjusting device having a manual focusing mode for directing a phototaking lens to an in-focus position by operation of a manually operated ring and an automatic focusing mode for automatically directing the phototaking lens to the infocus position by the revolution output of a motor. This focus adjusting device is such that when a manual focusing mode is selected, a member for moving the phototaking lens in the direction of the optical axis thereof and a manually operated ring rotatable circumferentially of a lens barrel are coupled together by a meshing clutch to thereby enable focus adjustment to be effected manually and when an automatic focusing mode is selected, the member for moving the phototaking lens in the direction of the optical axis thereof and a motor producing a revolution output for automatically directing the phototaking lens to an in-focus position are coupled together by another meshing clutch to thereby enable automatic focus adjustment to be effected.

Generally, it is usual that the lens barrel has limit means for blocking movement of the phototaking lens in the direction of the optical axis thereof when the phototaking lens has come to an infinity in-focus position and when the phototaking lens has come to a very short distance in-focus position. Accordingly, even if a force which tends to drive the phototaking lens when the phototaking lens has come to the infinity in-focus position or the very short distance in-focus position is transmitted, in order that the limit member may not be destroyed by the driving force or in order that an intermediate mechanism for transmitting the driving force to the limit member may not be destroyed during the transmission of the driving force, the limit member and the intermediate mechanism must have their own suitable strength.

In the aforementioned conventional device, the force of the person who rotates the manually operated ring when the manual focusing mode is selected is intactly transmitted through the meshing clutch to the member for moving the phototaking lens in the direction of the optical axis thereof and the revolution force of the motor is intactly transmitted through another meshing clutch to the member for moving the phototaking lens in the direction of the optical axis thereof when the automatic focusing mode is selected and therefore, where it is intended to provide this device with the above-mentioned limit member, the limit member and the intermediate mechanism must be made to have such strength that can withstand both the force of the person who rotates the manually operated ring and the revolution force of the motor. The force of the person who rotates the manually operated ring is much greater than the revolution force of the motor which effects focus adjustment and therefore, where it is intended to provide the conventional device with the limit member, the strength of the limit member and the intermediate mechanism must be set so that they can withstand the force of the person who rotates the manually operated ring. Accordingly, when it is intended to provide the aforementioned conventional device with the limit member, the limit member and the intermediate mechanism will become bulky to secure the strength thereof and necessarily, the entire device will become bulky.

SUMMARY OF THE INVENTION

It is an object of the present invention to eliminate the above-noted disadvantages and to provide a focus adjusting device which can drive the phototaking lens both by operation of the manually operated ring and by the revolution output of the motor and in which the limit member and the intermediate mechanism re not destroyed when the manually operated ring is operated and moreover, the limit member and the intermediate mechanism can be constructed compactly.

The invention will become fully apparent from the following detailed description thereof taken in conjunction with the accompanying drawings.

DESCRIPTION OF THE PREFERRED EMBODIMENT

Figure 1:
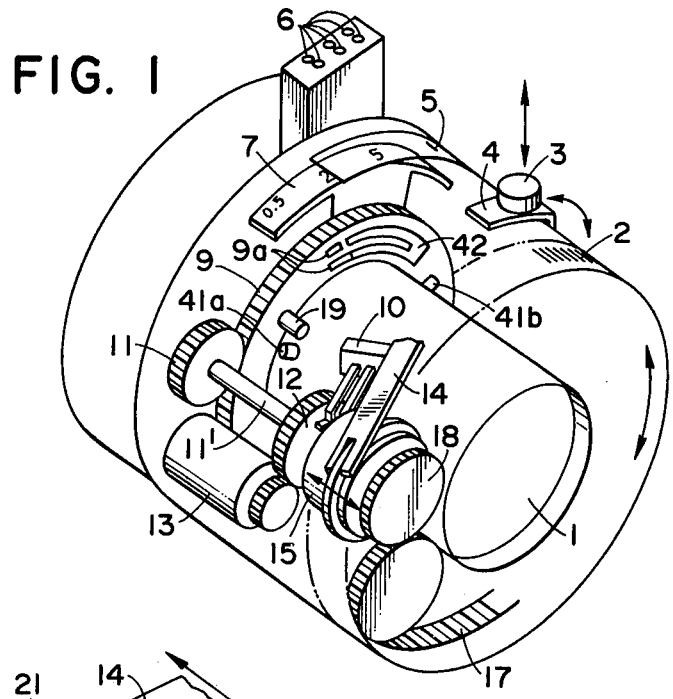
FIG. 1 is a conceptional perspective view schematically showing an embodiment of the present invention.

FIG. 1 which shows an embodiment of the present invention is a perspective view of only the lens barrel of an auto focus camera and showing a condition in which it has been set to a manual focusing mode. In the case of the manual focusing mode, a main switch 10 is in its OFF position and an auto-manual change-over clutch 15 operates such that a lens driving gear 11 for driving a phototaking lens 1 contained in the lens barrel and a manual interlocking gear 18 are rotated together. A manual focusing ring 2 is adapted to be freely rotatable without being limited and, when this manual focusing ring 2 is rotated circumferentially of the lens barrel, a manual focusing ring gear 17 formed within the manual focusing ring 2 is rotated and the rotation is transmitted through the manual interlocking gear 18 supported on the lens barrel and the auto-manual change-over clutch 15 to the lens driving gear 11 supported on the lens barrel and a focus position adjusting gear 9 rotatable about the phototaking lens 1 to move the phototaking lens 1 in the direction of the optical axis thereof and thus, manual focusing operation is accomplished in a manner similar to that of the conventional lens barrel.

A movement limiting member 19 is attached to the focus position adjusting gear 9 and bears against limit pins 41a and 41b fixed to the lens barrel, at the limits of the in-focus range of the phototaking lens 1, namely, the infinity in-focus position and the very short distance in-focus position, to thereby limit the angle of rotation of the focus position adjusting gear 9.

The in-focus distance can be confirmed by reading through a window 5 the scale on a focusing position indicator 7 varied by rotation of the focusing position indicator 7 attached integrally with the focus position adjusting gear 9.

When an auto-manual change-over member 4 is moved circumferentially to set it to an automatic focusing mode, an auto-manual change-over lever 14 becomes operatively associated therewith to close the main switch 10 and the auto-manual change-over clutch 15 operates such that the engagement between the lens driving gear 11 and the manual interlocking gear 18 is released and instead, the lens driving gear 11 and an automatic interlocking gear 12 rotate together.

Accordingly, when a focus position adjusting signal output from the focus detecting portion (not shown) of the camera is transmitted to the lens barrel through a connector 6, a motor 13 is revolved by the focus position adjusting signal and the revolution of the motor is transmitted through the automatic interlocking gear 12 to the lens driving gear 11 and the focus position adjusting gear 9, so that the phototaking lens 1 is moved in the direction of the optical axis thereof and focusing operation is effected automatically.

The in-focus distance can be confirmed through the window 5 by means of the focusing position indicator 7 similarly to the case of selection of the manual focusing mode.

When the auto-manual change-over member 4 is set to the automatic focusing mode, the engagement between the manual interlocking gear 18 and the lens driving gear 11 is released and therefore, even if the manual focusing ring 2 is rotated, no influence is imparted to the phototaking lens 1, the lens position adjusting gear 9 and the focusing position indicator 7.

If, thereafter, the change-over member 4 is moved in the direction opposite to the direction in which it was moved when the automatic focusing mode was selected, the connection between the gear 11 and the gear 12 is cut off and the gear 11 becomes connected to the gear 18. The clutch 15 can connect the gear 11 and the gear 18 together at wherever rotational position the manual focusing ring 2 may be and, if the manual focusing ring 2 is rotated thereafter, manual focusing can be accomplished as previously described.

Figure 2:
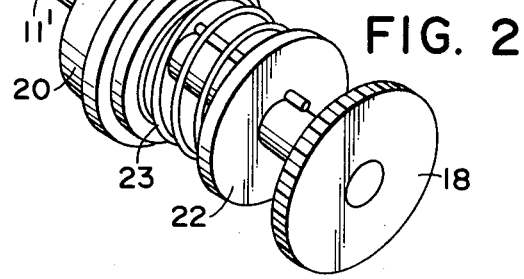
FIG. 2 is a perspective view of the clutch in the embodiment.

FIG. 2 shows the details of the above-described auto-manual change-over clutch 15. In the present embodiment, the auto-manual change-over lever 14 moves in the direction of arrow in response to the operation of the auto-manual change-over member 4. When the change-over member 4 is set to the automatic focusing mode, the projection 21 of a meshing clutch member 20 meshes with a recess 12a formed in the automatic interlocking gear 12, and when the change-over member 4 is set to the manual focusing mode, a friction clutch plate 22 is brought into friction engagement with the manual interlocking gear 18 by the force of a spring 23.

In the present embodiment, a movement limiting member 19 arrives at the limit pins 41a and 41b during focusing operation and the friction engagement is used to prevent damage of the internal mechanism when the manual focusing ring 2 is further rotated thereafter by an excessive force. That is, when the rotation of the gear 9 is blocked by the limit pin 41a or 41b, rotation of the clutch plate 22 is stopped and, when the manual focusing ring 2 is then rotated, slip occurs between the clutch plate 22 and the grar 18.

Members 20, 21, 22 and 23 are spline-coupled to a shaft 11' and are axially slidable but rotatable together. The gears 18 and 12 are rotatably provided on the shaft 11'. Accordingly, when the projection 21 meshes with the recess 12a, revolution of the motor 13 is transmitted to the gear 11 through the gear 12, the clutch member 20 and the shaft 11' and the gear 18 is not rotated. Also, when the clutch plate 22 is frictionally coupled to the gear 18, rotation of the manual focusing ring 2 is transmitted to the gear 11 through the gear 18, the clutch plate 22 and the shaft 11' and the gear 12 is not rotated. In order to ensure the mesh engagement of the projection 21 with the recess 12a when the mode is changed over to the automatic focusing mode, the friction clutch plate 22 is somewhat urged by the gear 18 in a position in which the projection 21 is in abutment with the end face 12b of the automatic interlocking gear 12, in spite of the change-over member 4 having been changed over to the automatic focusing mode, and the biasing force of the spring 23 is not completely released until the projection 21 meshes with the recess 12a.

Figure 3:
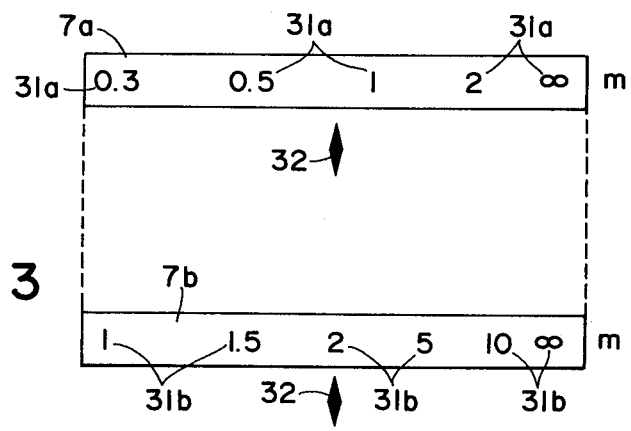
FIG. 3 illustrates the display of each interchangeable lens.

FIG. 3 shows a developed view of the focusing position indicator 7 of lens barrels having different focal lengths. In FIG. 3, the focusing position indicator 7a for wide angle lens and the focusing position indicator 7b for telephoto lens respectively have numerical values 31a and 31b from the very short photographing distance to infinity marked within a predetermined angle about the optical axis. The in-focus distance can be read with the aid of an index mark 32 provided in the window 5.

The focusing position indicator 7 are integral with the focus position adjusting gear 9 as previously described and the movement limiting member 19 of the phototaking lens 1 is attached to the focus position adjusting gear 9 and therefore by making the focusing position indicators 7a and 7b rotatable through a predetermined angle of rotation relative to each interchangeable lens, the focusing mechanism of each interchangeable lens can be constructed by substantially the same arrangement.

Also, the reduction ratio of the automatic interlocking gear 12 which transmits the torque of the motor 13 during automatic focusing operation is made substantially equal to the ratio of the total amount of movement of the phototaking lens 1.

For example, where the total amount of movement in the direction of the optical axis of an interchangeable lens having a focal length of 40 mm is about 4 mm and the total amount of movement in the direction of the optical axis of an interchangeable lens having a focal length of 80 mm is about 8 mm, the reduction ratio for the latter lens is about twice that for the former lens. By this, it is possible to render the load applied to the motor 9 substantially constant and thus, motors of the same specification can be used. The proportion of the total amount of movement to the reduction ratio from the motor 13 to the gear 9 which is the final output stage may be made equal if the open F-values of the interchangeable lenses are equal, but it is determined by the depth of field when the open F-values differ from one another. In the embodiment, the automatic interlocking gear 12 is shown as being of a single stage, but of course it may be constructed into plural stages.

A focus lock button 3 provided on the change-over member 4, by being depressed during automatic focusing operation, serves to cut off the supply of current from a power source, exert brake on the motor 13 and stop the motor 13, and a distance signal produced from a pattern 9a on the gear 9 and a brush 42 fixed to the lens barrel and having the end thereof located on the pattern 9a is used also as a signal for reversing the direction of revolution of the motor 13 near the position whereat the movement limiting member 19 bears against the limit pins 41a and 41b.

In the embodiment, the range of the lens 1 from the very short distance to infinity, namely, the in-focus range, is prescribed by limiting the angle of rotation of the gear 9 by the fixed pins 41a and 41b. Assuming that a fixed pin is provided between the manual focusing ring 2 to the clutch 15 and rotation of the manual focusing ring 2 is limited by this fixed pin to thereby prescribe the range of rotation of the manual focusing ring 2, the lens 1 cannot be moved throughout the in-focus range by operation of the manual focusing ring 2 unless the clutch 15 is coupled with the range of rotation of the manual focusing ring 2 being coincident with the in-focus range of the lens 1, but if the phototaking lens driving members such as gears 11 and 9 are limited in rotation by the fixed pins 41a and 41b, the necessity of the operation for making the range of rotation of the manual focusing ring 2 coincident with the in-focus range of the lens 1 will be eliminated and the manual focusing ring 2 and the gear 11 may be coupled together at any point of time.

The embodiment hitherto described is such that the motor 13 is operated by the signal of the focus detecting portion and the phototaking lens 1 is automatically directed to the in-focus position by revolution of the motor 13. However, the present invention may also be achieved by using not such an auto focus device but a so-called power focus device in which the motor 13 is operated by operation of an operating member, not shown, and when the photographer has recognized the in-focus condition of the phototaking lens 1 by finder observation or the like, the operation of the operating member is discontinued to stop the phototaking lens 1 in this condition.

I claim:

1. In a focus adjusting device of a camera having moving means for moving a phototaking lens in the direction of the optical axis thereof, a motor producing a revolution output, a manually operated ring provided on the outer periphery of a lens barrel and rotatable circumferentially of said lens barrel, mode selecting means for selecting one of a manual mode in which said phototaking lens is driven by said manually operated ring and an automatic mode in which said phototaking lens is driven by said motor, and clutch means for coupling said moving means and said manually operated ring together when the manual mode has been selected by said mode selecting means and for cutting off the coupling between said moving means and said manually operated ring when the automatic mode has been selected by said mode selecting means, the improvement comprising limit means for blocking movement of said moving means when said phototaking lens has come to an infinity in-focus position and when said phototaking lens has come to a very short distance in-focus position, said clutch means producing slip between said manually operated ring and said moving means when said manually operated ring is rotated by a great torque, thereby permitting rotation of only said manually operated ring.

2. The improvement recited in claim 1, wherein said focus adjusting device has another clutch means for coupling said moving means and said motor together when the automatic mode has been selected by said mode selecting means and for cutting off the coupling between said moving means and said motor when the manual mode has been selected by said mode selecting means.

3. The improvement recited in claim 1, wherein said clutch means is a friction clutch.

4. The improvement recited in claim 1, wherein said motor drives said moving means so as to automatically direct said phototaking lens to an in-focus position.

5. In a focus adjusting device of a camera having moving means for moving a phototaking lens in the direction of the optical axis thereof, a motor producing a revolution output, a manually operated ring provided on the outer periphery of a lens barrel and rotatable circumferentially of said lens barrel, mode selecting means for selecting one of a manual mode in which said phototaking lens is driven by said manually operated ring and an automatic mode in which said phototaking lens is driven by said motor, and clutch means for coupling said moving means and said manually operated ring together when the manual mode has been selected by said mode selecting means and for cutting off the coupling between said moving means and said manually operated ring when the automatic mode has been selected by said mode selecting means, the improvement comprising limit means for blocking movement of said moving means when said phototaking lens has come to an infinity in-focus position and when said phototaking lens has come to a very short distance in-focus position, and slip means for producing slip between said manually operated ring and said moving means when said manually operated ring is rotated by a great torque, thereby permitting rotation of only said manually operated ring.

6. A focus adjusting device according to claim 5, wherein said slip means produces slip between said manually operated ring and said moving means when the moving means is prevented from moving by said limit means in response to rotation of the manually operated ring in a selected direction, thereby permitting further rotation of the manually operated ring in that direction.

7. A focus adjusting device according to claim 6, wherein said clutch means is a frictional clutch which frictionally couples said moving means with said manually operated ring together when the manual mode has been selected and which cuts off the frictional coupling between the moving means and the ring when the automatic mode has been selected, the clutch means itself having a function of said slip means.

* * * * *